Oct. 17, 1967     D. B. BOWEN     3,347,590
CAMPER BODY STABILIZER
Filed March 28, 1966
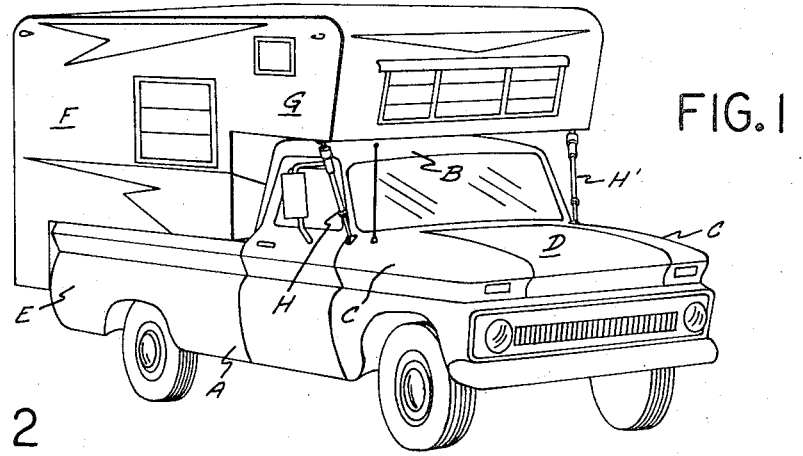
FIG. 1
FIG. 2
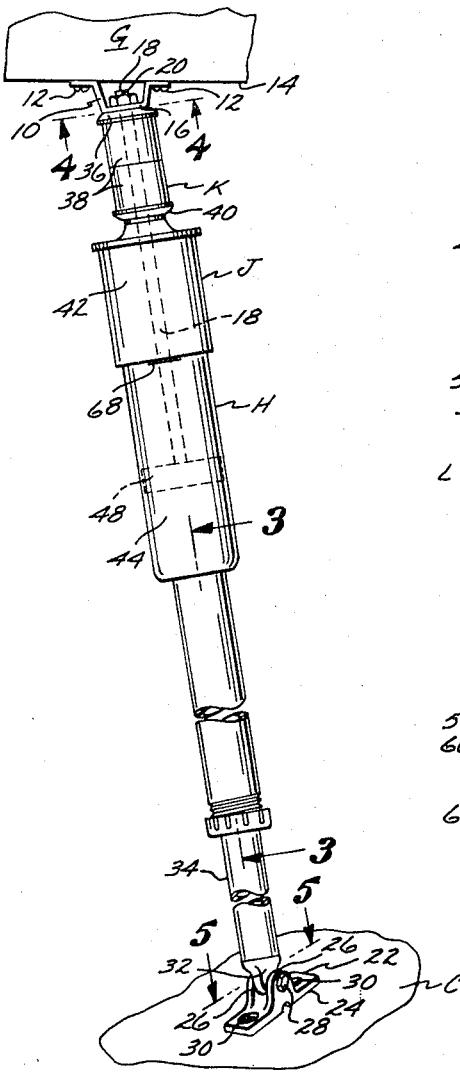
FIG. 3
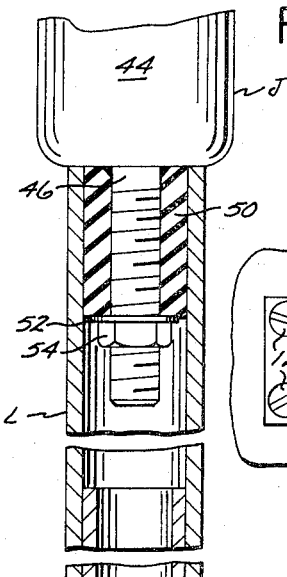
FIG. 4
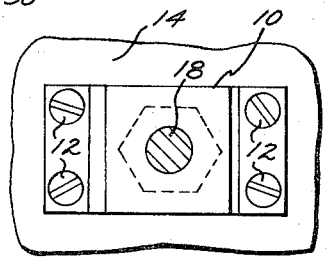
FIG. 5
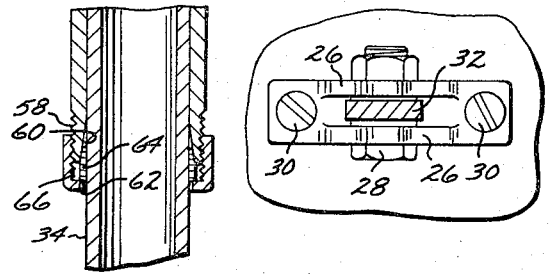
INVENTOR.
DONALD BYRON BOWEN
BY
William C. Bobrick
ATTORNEY United States Patent Office 3,347,590
Patented Oct. 17, 1967

3,347,590
CAMPER BODY STABILIZER
Donald Byron Bowen, 1816 Sherwood,
Covina, Calif. 91722
Filed Mar. 28, 1966, Ser. No. 537,880
2 Claims. (Cl. 296—23)

The present invention relates generally to the field of automotive accessories, and more particularly to a stabilizing device that minimizes the vibration imparted to a camper supported on a pickup truck, as well as substantially eliminating sway and bounce of the camper relative to the supporting vehicle.

During the past few years, pickup trucks have been used increasingly for movably supporting a camper body of the type that has a forward portion that extends over the cab of the vehicle, as well as outwardly from each side thereof. Such combinations have the advantage that they permit the truck to be used selectively for either normal hauling purposes, or movably supporting a camper body.

Prior to the present invention, when a camper body was so supported on a pickup truck, it was subject to substantial vibration when the truck was in motion, that tended to reduce the useful life thereof, as well as the camper having a tendency to bounce or hop.

A major object of the present invention is to provide a pair of stabilizing devices that may be removably mounted on a pickup truck and so connected to a camper body supported by the vehicle that driving of the vehicle is made easier and safer by minimizing the transfer of vibrations from the vehicle to the camper, and the devices also tending to reduce sway, bounce, and hop of the camper relative to the supporting vehicle.

Another object of the invention is to provide a stabilizer that not only serves the functions above named, but also provides additional support for the portion of the camper that extends forwardly over the cab of the vehicle.

A still further object of the invention is to provide a camper body stabilizing device that has an extremely simple mechanical structure, can be fabricated from standard, commercially available materials, is simple and easy to install, requires a minimum of maintenance attention, and can be retailed at a sufficiently low price as to encourage its widespread use for its intended purposes.

These and other objects and advantages of the invention will become apparent from the following description of a preferred form thereof, and from the accompanying drawing illustrating the same, in which:

FIGURE 1 is a perspective view of a pickup truck having a camper body supported thereon, and a pair of stabilizing devices extending upwardly and outwardly from the forward portion of the vehicle to underside portions of the camper body situated over the cab of the vehicle;

FIGURE 2 is a side elevational view of one of the stabilizing devices;

FIGURE 3 is a an enlarged longitudinal cross-sectional view of a portion of the device shown in FIGURE 2, taken on the line 3—3 thereof;

FIGURE 4 is a bottom plan view of a portion of one of the devices, taken on the line 4—4 of FIGURE 2; and FIGURE 5 is a top plan view of a portion of one of the devices taken on the line 5—5 of FIGURE 2.

Referring now to the drawing for the general arrangement of the invention, it will be seen that it includes a pickup truck A of the type that has a forwardly disposed cab B, fender portions C that extend forwardly from the cab, and a hood D situated between the fender portions. The truck A removably supports on the bed E thereof a camper body F that has a portion G that extends forwardly over the cab B, as well as outwardly on each side thereof. A pair of stabilizing devices referred to generally by the letters H and H', are removably supported from the fender portions C of the truck A, and extend to the undersurfaces of the camper portion G, as may best be seen in FIGURE 1. The stabilizing devices H and H' are identical in construction, and accordingly only the device H will be described in detail, which device is illustrated in FIGURES 2 to 5 inclusive.

The stabilizing device H, as may be seen in FIGURE 2, includes a generally U-shaped bracket 10 that is secured by screws 12 or other means to the undersurface 14 of the camper portion G situated outwardly from the cab B. The first bracket 10 includes a downwardly and outwardly extending web 16 that has a centrally disposed bore (not shown) therein through which a rod 18 extends that has threads 20 formed on the upper portion thereof. The purposes of the first brackets 10 will later become apparent.

Two second brackets 22 are provided, one of which is shown in FIGURE 2 as removably mounted on the rearward upper portion of one of the fender portions C of the vehicle A. Bracket 22 includes an elongate base 24 from which two lugs 26 extend upwardly and support a bolt 28 therebetween. Base 24 is secured to one of the fender portions C by screws 30, or other conventional fastening means, that may be employed advantageously for this purpose. Bolt 28 pivotally engages an opening (not shown) in an ear 32 that extends downwardly from an elongate rigid member 34. Member 34, to minimize shipping weight of the stabilizing device, is preferably of tubular structure.

Each rod 18 is a part of a shock absorber J, which is of the hydraulic type, and currently in use on automotive vehicles. The shock absorber J includes a bushing assembly K mounted on the upper portion of rod 18. Each bushing assembly K comprises an upper rigid plate 36 slidably mounted on rod 18, one or more annularly shaped resilient bodies 38 that encircle the rod 18 below the upper rigid plate 36, and a lower rigid plate 40 that is secured to the rod and abuts against the lowermost body 38. A first cylindrical inverted cup 42 depends from lower plate 40, and slidably engages a second cylindrical cup 44 that has a stud bolt 46 projecting downwardly therefrom.

The rod 18 extends into the confines of the cups 42 and 44. Rod 18 on its lowermost end is secured to a piston 48 that is slidable inside the cup 44. The piston 48 as it moves, forces fluid through a small orifice (not shown). Varying the size of the orifice controls the rate at which the piston will move upwardly relative to the cup 44, as the bodies 38 tend to return from a compressed state to the form shown in FIGURE 2. An annular shaped resilient body 50, preferably formed of rubber or the like material, encircles the stud bolt 46 for part of the longitudinal length thereof, as can best be seen in FIGURE 3. A rigid washer 52 also encircles the stud bolt 46 and is held in abutting contact with the lower surface of the body 50 by a nut 54. When the nut 54 is tightened on the stud bolt 46, the washer 52 is moved upwardly to compress the body 50, and radially expand the same.

Each stabilizing device H includes a tubular shell L, best seen in FIGURE 3, that has such internal transverse cross section that the resilient body 50 is slidably engaged thereby, when the nut 54 is in a non-tightened position on the bolt 46. The tubular shell L has threads 58 formed on the lower end thereof, and the lower end portion of the shell L also having a downwardly and outwardly extending internal surface 60, as shown in FIGURE 3.

The surface 60 and the external surface of the rigid member 34 define a tapered confined space 62, in which a circular band 64 is disposed that is moved upwardly relative to the tubular member 34 when a lock nut 66 is tightened on the threads 58. When the band 64 is moved upwardly in the wedge-shaped space 62, it is forced into frictional gripping contact with the external surface of the member 34, to prevent further longitudinal movement of the tubular member 34 relative to the cylindrical shell L. The shell L is held in a fixed position relative to the shock absorber J by tightening the nut 54 to radially expand the body 50. The body 50 when so expanded, frictionally grips the interior surface of the cylindrical shell L to the extent that the shell is held at a fixed position relative to the cup 44.

The use and operation of the invention is extremely simple. The brackets 10 and 22 are affixed to each side of the cab portion G and fender portions C as shown in FIGURE 1. Shell L is now slid onto resilient body 50, and subsequently gripped thereby by tightening the nut 54 by a long handled wrench (not shown). The shell L is now removably locked to the shock absorber J. Shock absorber J now has the cups 42 and 44 thereof adjusted to dispose the lower edge of cup 42 in alignment with a line 68 defined on the external surface of cup 44. The piston 48 when cups 42 and 44 are so adjusted, will dampen the movement of the cups relative to one another equally well both on shock and rebound.

Member 34 is now slid into the shell L. Rod 18 is secured to bracket 10 by use of a nut 70 that engages threads 20 as shown in FIGURE 2. Bolt 28 is now inserted through ear 32 to pivotally support member 34 on bracket 22. The lock nut 66 is tightened to hold member 34 in a fixed longitudinal position relative to shell L.

With the stabilizing devices H and H' mounted on the vehicle A, as above described, the vehicle with the camper body F mounted thereon is ready for use. In use the stabilizing devices H and H' minimize vibrations and shock being transferred to the camper body due to the action of the shock absorbers J as well as the bushing assemblies K associated therewith. Also, the stabilizing devices H and H' when mounted as above described, eliminate "sway" and "bounce" and "hop" as the camper body-supporting vehicle A is driven.

Although the present invention is fully capable of achieving the objects and providing the advantages hereinbefore mentioned, it is to be understood that it is merely illustrative of the presently preferred embodiment thereof and I do not means to be limited to the details of construction herein shown and described, other than as defined in the appended claims.

I claim:
1. In combination with a pickup truck having a cab and a hood and fender portions that extend forwardly from said cab, a camper body supported on said truck, said camper body having a forward portion that extends over said cab and to each side thereof, two laterally spaced stabilizing devices extending between said camper body forward portion and said fender portions for minimizing the vibration of said camper body and movement of said camper body relative to said truck when the same are in motion, said devices including:
(a) two first brackets rigidly secured to the undersurface of said forward portion of said camper body;
(b) two transversely aligned second brackets rigidly secured to said fender portions;
(c) two elongate shock absorber means;
(d) third means for supporting said shock absorber means in depending positions from said first brackets;
(e) two stud bolts rigidly secured to the lower extremities of said shock absorber means;
(f) two annular-shaped bodies of resilient material that encircle the upper portions of said stud bolts;
(g) two rigid washers that encircle said stud bolts and abut against the lower surfaces of said resilient bodies;
(h) two nuts that engage said stud bolts and when tightened move said washers upwardly thereon to compress said resilient bodies and radially expand the same;
(i) two elongate rigid upwardly extending members pivotally supported from said second brackets;
(j) two elongate tubular shells that slidably engage said elongate members, said shells having threads formed on the external surfaces of said first end portions, as well as outwardly tapering internal surfaces adjacent said threads, said shells having second end portions that slidably engage said resilient bodies when said nuts are not in tightened positions on said stud bolts;
(k) two ring-shaped bands at least partially disposed in spaces defined between said outwardly tapering surfaces and the external surfaces of said elongate members; and
(l) two lock nuts that engage said threads, with said lock nuts when tightened moving said bands upwardly on said elongate members to wedge said bands into gripping engagement with said elongate members and said shells to prevent relative longitudinal movement therebetween, and said nuts when tightened on said stud bolts compressing said resilient bodies to radially expand the same to the degree that said cylindrical shells are held at fixed positions relative to said shock absorber means, and said shock absorber means minimizing relative movement of said camper body relative to said truck when both are in motion.

2. A device as defined in claim 1, in which said first brackets have openings formed therein and said shock absorber means include rods projecting upwardly therefrom on which resilient bushing assemblies are mounted, with said rods having threaded end portions that project upwardly through said openings in said first brackets, and said first means being nuts that engage said threads to removably support said rods from said first brackets.

References Cited

UNITED STATES PATENTS 3,170,583  2/1965  Meyer _____ 224—42.1
3,217,914  11/1965  Aldropp _____ 296—23

BENJAMIN HERSH, *Primary Examiner.*

P. GOODMAN, *Assistant Examiners.*